United States Patent [19]

Fleming

[11] 4,260,942
[45] Apr. 7, 1981

[54] FAILURE DETECTION AND CORRECTION SYSTEM FOR REDUNDANT CONTROL ELEMENTS

[75] Inventor: Alan W. Fleming, Palos Verdes Peninsula, Calif.

[73] Assignee: TRW Inc., Redondo Beach, Calif.

[21] Appl. No.: 897,072

[22] Filed: Apr. 17, 1978

[51] Int. Cl.³ .............................................. G05B 23/02
[52] U.S. Cl. .................................. 318/565; 244/165; 244/194; 318/648; 318/649
[58] Field of Search ............... 318/564, 565, 648, 649; 244/165, 194

[56] References Cited

U.S. PATENT DOCUMENTS

| | | | |
|---|---|---|---|
| 3,422,327 | 1/1969 | McBrayer et al. | 318/564 |
| 3,440,504 | 4/1969 | Boskovich et al. | 318/565 |
| 3,999,729 | 12/1976 | Muhlfelder et al. | 244/165 |

Primary Examiner—J. V. Truhe
Assistant Examiner—Eugene S. Indyk
Attorney, Agent, or Firm—Donald R. Nyhagen; John J. Connors

[57] ABSTRACT

Apparatus and a related method for detecting failures of control elements, such as skewed-axis reaction wheels with closed-loop speed control, used in satellite attitude control systems, and for compensating for such failures and thereby maintaining continuity of operation. The apparatus includes a wheel loop model for simulating operation of each of the reaction wheels and speed control loops in the satellite, and for deriving an estimated wheel speed from a command speed for each wheel. By comparing the estimated speed of each wheel with the corresponding actual or observed speed, the apparatus determines whether a failure was occurred in the wheel, or in its control loop. Upon detection of such a failure, the apparatus disconnects driving power from the failed wheel, modifies the corresponding wheel loop model to reflect disconnection of power, and reconfigures a distribution matrix in such a manner that a set of desired momentum commands with respect to the vehicle axes is properly redistributed among the remaining reaction wheels. Compensation is also made for the momentum contributions of failed wheels that continue to spin after being powered down.

31 Claims, 5 Drawing Figures

4,260,942

FAILURE DETECTION AND CORRECTION SYSTEM FOR REDUNDANT CONTROL ELEMENTS

BACKGROUND OF THE INVENTION

This invention relates generally to control systems having one or more redundant control elements to provide continuity of operation in the event that one or more of the elements should fail. More particularly, the invention relates to attitude control systems for space vehicles, such as satellites.

For satellites to perform their intended functions, precise control of their attitude with respect to three orthogonal axes is essential. This is particularly true of communication satellites, which are typically placed in a geosynchronous or twenty-four-hour orbit, so as to remain essentially above the same point on the earth's surface. The attitude of such a satellite must be continuously corrected to maintain one face of the vehicle constantly oriented towards the earth, and also to compensate for any external disturbance torques acting on the vehicle. One well known technique for attitude control of satellites utilizes the principle of the reaction wheel. In simple terms, whenever the speed of a rotatable wheel is changed, an acceleration torque must be applied to it, usually by a drive motor, and an equal and opposite reaction torque is exerted on the motor. If the wheel and drive motor are mounted in a satellite, the reaction torque is applied to the satellite, and tends to accelerate it in the opposite direction to the wheel.

Another way of viewing operation of the reaction wheel is from the standpoint of conservation of momentum. When the angular momentum [speed] of a reaction wheel is, for example, increased, there is a corresponding increase in the angular momentum of the vehicle in the opposite direction, thereby preserving a constant total angular momentum with respect to inertial space. Each reaction wheel is controlled by a relatively high-bandwidth speed control loop, and attitude control is achieved by commanding wheel speeds, and hence angular momenta, as functions of attitude error.

It will be apparent that at least three such reaction wheels are required to effect attitude control in three orthogonal vehicle axes. The three axes are usually defined as the roll, yaw and pitch axes. For an earth-oriented satellite, the roll axis is parallel with the direction of oribital velocity of the satellite, the yaw axis is aligned with the local vertical direction, i.e., with a radial line through the center of the earth, and the pitch axis is orthogonal to both the roll axis and yaw axis.

If three reaction wheels are orthogonally arranged in the vehicle, they can be utilized to control the angular speed and attitude of the vehicle with respect to its three axes. Such a control system, however, would be rendered inoperative upon the failure of any one of the reaction wheels, since the remaining two wheels can have no effect on the vehicle's attitude with respect to the axis corresponding to the failed wheel. For this reason, more than three wheels are typically used.

One well known way of providing failure redundancy is to include a standby redundant wheel for each of the orthogonal wheels. This requires a total of six wheels, two for each control axis, and is commonly known as an "orthogonal redundant" system. Another way of providing failure redundancy is to use four or more wheels oriented in directions that are skewed with respect to the orthogonal vehicle axes. Each skewed-axis wheel contributes torque or momentum to more than one vehicle axis, and any desired set of momentum commands in the three vehicle axes can be given effect by means of a corresponding set of momentum commands applied to the wheels. If one of the wheels should fail, a different set of momentum commands must then be applied to the remaining wheels to obtain the same desired set of momentum commands in the three vehicle axes. So long as at least three reaction wheels having non co-planar axes remain operative, it is always possible to obtain the desired set of momentum commands in the three vehicle axes.

The afore-described use of redundant reaction wheels for the control of space vehicle attitude is well known to designers of such systems. For example, U.S. Pat. No. 4,071,211 entitled "Momentum Biased Active Three-Axis Satellite Attitude Control System", and issued in the name of Muhlfelder et al, discloses a typical example of a four-wheel attitude control system. Such four-wheel systems are often arranged with the wheels in a pyramid configuration, the wheel axes being equally spaced about one of the vehicle axes, such as the pitch axis, and being equally inclined to the plane in which the other two axes lie, such as the roll-yaw plane.

Although the basic technique of employing one or more redundant reaction wheels for satellite attitude control has been known for some years, there has heretofore been no effective technique for rapidly and autonomously detecting the failure of a reaction wheel, and for compensating for the failed wheel in such a manner that the vehicle attitude is still controlled as intended during a failure transient. Accordingly, there is a clear need for a system for detection of and compensation for a control element failure, which is operative rapidly and effectively enough to maintain continuity of operation and performance of the attitude control system, even during the period of detection and correction. The present invention fulfills this need.

SUMMARY OF THE INVENTION

The present invention resides in apparatus and a corresponding method for its operation, for detecting the failure of control elements by simulating their operation in a model, and comparing actual performance parameters of the control elements with corresponding estimated performance parameters obtained from the model. When the actual performance parameter of a control element differs from the corresponding estimated performance parameter to a preselected degree, the control element is deemed to have failed, and appropriate action can be taken to deactivate the element and to compensate for the failure.

Briefly, and in general terms, the apparatus of the invention comprises control element modeling means, for simulating operation of the control elements and generating an estimated performance parameter for each control element, and failure determination means for comparing the estimated performance parameter with a corresponding observed performance parameter, and for determining whether the difference between the actual performance parameter and the estimated performance parameter for each control element is such that the control element may be considered to have failed. For rapid compensation for such a failure, the apparatus should also include control means responsive to detection of a failure by said failure determination means, for deactivating the control element that failed, and for taking other steps to compensate for the failure.

Preferably, the control means, which deactivates the control element that failed, should also be operative to effect an appropriate redistribution of command signals to the remaining control elements, to compensate for the absence of the failed control element. Some types of control elements, such as reaction wheels, may continue to have an effect on the vehicle, even after failure and deactivation. It is important in such cases that the control means should also be operative to compensate for the continued presence and resultant effect on the vehicle of each failed control element.

More specifically, the invention resides in failure detection and correction apparatus for use in an attitude control system having a plurality of control elements, at least one of which is redundant in control authority. In this context, the apparatus of the invention also comprises distribution matrix means for distributing to the control elements signals derived from a set of attitude commands, relating to as many as three orthogonal control axes. For the control of attitude with respect to three orthogonal control axes, at least four control elements are required for redundancy, each being effective about an axis which is skewed with respect to the orthogonal control axes. The control means of the apparatus also includes means for reconfiguring the distribution matrix means upon detection of the failure of one of the control elements, so that the command signals relating to the control axes can be properly distributed among a lesser number of control elements than was available before the failure.

Even more specifically, in the presently preferred embodiment of the invention, for the control of the attitude of a space vehicle, the control elements are reaction wheels oriented with their axes of rotation skewed with respect to the orthogonal control or vehicle axes, and the distribution matrix means functions to distribute the command signals relating to the three vehicle axes to a greater number of reaction wheels oriented in the skewed axes. For example, if the attitude control system calls for a particular set of momentum commands to be applied to the vehicle axes, these momentum commands are transformed in the distribution matrix means into a usually larger set of momentum commands to be applied to the reaction wheels.

In the control element modeling means of the invention, the operation of each reaction wheel is simulated, and allowances made for the effect of a speed feedback control loop, as well as for the effects of motor performance characteristics, friction and windage. From each reaction wheel there is obtained an estimated wheel speed which is compared in the failure determination means with the actual wheel speed measured by a tachometer.

In the preferred embodiment of the invention, the failure determination means operates by comparing the difference between the estimated wheel speed and the actual wheel speed with a preselected threshold difference value. If the threshold is exceeded for a preselected time, the wheel is considered to have failed, and appropriate action is taken by the control means of the invention apparatus. This action includes reconfiguring the distribution matrix means, so that the desired set of momentum commands for the three vehicle axes will be redistributed among the reaction wheels that have not failed. Furthermore, upon detection of a failure condition, power is removed from the failed reaction wheel, and the wheel loop model for that reaction wheel is modified to reflect the fact that no power is being supplied to it. The model then simulates a free-running reaction wheel which will eventually stop under the effects of friction and windage torques.

Although a failed reaction wheel is effectively removed from consideration in this manner, it may still have significant momentum, which will continue to contribute to the momentum of the vehicle in the three vehicle axis. Accordingly, the apparatus of the invention includes means for compensating for the momentum contributions of failed reaction wheels, by resolving the momentum contribution of each failed wheel in the three orthogonal vehicle axes, and subtracting the failed wheel contributions in these axes from the corresponding momentum command signals in the vehicle axes.

It will be appreciated from the foregoing that the present invention represents a significant advance in the field of control systems generally, and the field of satellite attitude control systems in particular. By providing an autonomous system for detecting and compensating for failures of control elements, the invention ensures that an attitude control system can continue to function without significant loss of control. Other aspects and advantages of the present invention will become apparent from the following more detailed description, taken in conjunction with the accompanying drawings.

DESCRIPTION OF THE PREFERRED EMBODIMENT

Figure 1:
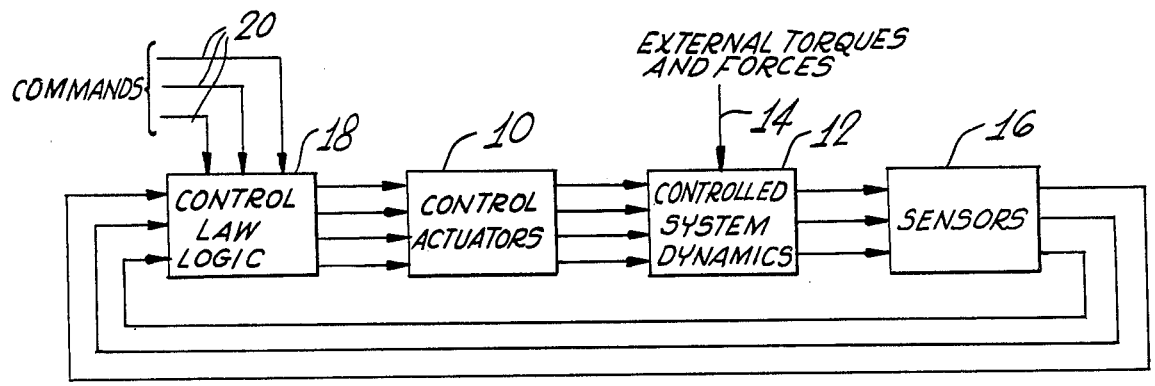
FIG. 1 is a simplified block diagram of a generalized closed-loop control system.

As shown in the drawings for purposes of illustration, the present invention relates to control systems which utilize a plurality of control elements or actuators, and is particularly concerned with attitude control systems for maintaining a desired orientation of a vehicle, such as an earth-orbiting satellite. As illustrated in conceptual form in FIG. 1, control systems in general may be considered to comprise a set of control actuators, indicated by reference numeral 10, which are effective to control some physical performance parameter, such as position or speed, of a controlled system, in accordance with the controlled system dynamics, indicated at 12. The controlled system may also be subject to external torques and forces, as indicated by the arrow at 14. The performance parameters of the controlled system are measured by sensors 16, the outputs of which are fed to some form of control law logic, indicated at 18, which also receives command signals, as indicated at 20. The control law logic 18 compares the command signals with the signals from the sensors 16, and, in accordance with a predefined control law, generates control signals to be applied to the control actuators 10.

In the particular type of control system with which the present invention is concerned, there are more control actuators than there are physical parameters to be controlled. This form of redundancy is usually built into control systems which are to be operated in inaccessible locations, such as in unmanned space vehicles, so that if one or more of the actuators should fail, the others may be utilized to continue to control the desired physical performance parameters. Thus, the control law logic also includes means for distributing control commands, intended to affect a set of performance parameters, to a usually larger set of control actuators.

Figure 2:
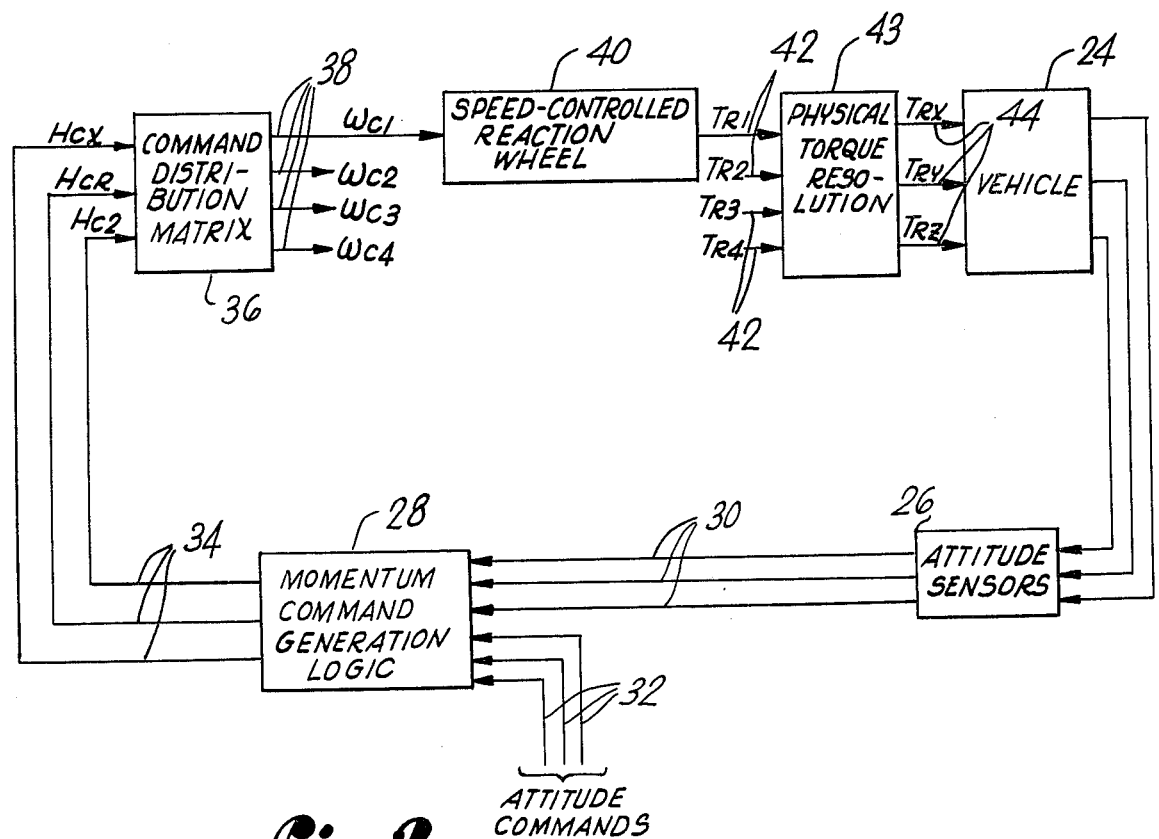
FIG. 2 is a simplified block diagram of a skewed-axis reaction wheel attitude control system for a space vehicle.

A more specific form of the generalized control system of FIG. 1, relating to a skewed-axis reaction wheel attitude control system for a space vehicle, is shown in FIG. 2. The controlled system in this case is the vehicle, indicated at 24, and the performance parameters that are to be controlled are the angular positions that define the attitude of the vehicle with respect to three orthogonal vehicle axes. These are often referred to as the pitch, roll and yaw axes of the vehicle, but these terms have particular meaning in relation to an earth-oriented satellite. To avoid any possible confusion in this regard, the vehicle axes will be referred to hereinafter as the x, y and z axes.

The attitude of the vehicle in the x, y and z axes, with respect to some frame of reference, such as the earth, or inertial space, is sensed by attitude sensors 26, which transfer this data to momentum command generation logic 28 over lines 30. Attitude commands are also supplied to the momentum command generation logic 28, over lines 32. The momentum command generation logic 28 compares the sensed attitude signals on lines 30 with the attitude commands on lines 32, and generates, in accordance with an appropriate control law, a set of three momentum commands which are to be applied in the x, y and z vehicle axes, respectively, in order to effect attitude correction consistent with the attitude commands supplied on lines 32.

The three angular momentum commands are applied to a command distribution matrix 36, which generates four corresponding commands on line 38, to be applied to four reaction wheels, one of which is indicated at 40, used to control the vehicle momentum, and hence its angular position, with respect to the x, y and z axes. The angular momentum of each of the reaction wheels 40 is, of course, proportional to its angular velocity or speed of rotation, since the moment of inertia of each wheel is constant and the angular momentum is given by the product of the angular velocity and the moment of inertia. Hence, the commands on line 38 may be considered to be speed commands which are used to regulate the speeds of the corresponding reaction wheels 40, and thereby to control the angular momenta of the wheels. Each of the blocks 40 containing the reaction wheels also includes a feedback control loop for maintaining the speed of the wheel at the selected value, proportional to the signal supplied on the corresponding one of the lines 38.

When torque is applied to any of the reaction wheels 40 to change is angular momentum, an equal and oppositely directed reaction torque is applied to the vehicle, as indicated by the lines 42 from the reaction wheel blocks 40 to a physical torque resolution matrix 43. In a skewed-axis reaction wheel system, each of the reaction wheel torques may contribute a torque component about each of the x, y and z axes. Accordingly, the four torques generated by the reaction wheels 40 may be resolved into three equivalent torques about the x, y and z axes, as indicated by lines 44. The resolution matrix 43 is not an electronic or electromechanical control system component, but merely represents the resolution of reaction torques, or angular momenta, that results from the geometric relationship between the vehicle axes and the reaction wheel axes. As is well known in this field, this resolution matrix, usually designated as C, may be defined for transformation from wheel axes to vehicle axes as follows:

$$\begin{bmatrix} V_x \\ V_y \\ V_z \end{bmatrix} = C \begin{bmatrix} V_1 \\ V_2 \\ V_3 \\ V_4 \end{bmatrix}, \tag{1}$$

where $V_1$, $V_2$, $V_3$ and $V_4$ are torque or momentum components about the four wheel axes, $V_x$, $V_y$ and $V_z$ are torque or momentum components about the vehicle axes, and C is a four-by-three matrix, the elements of which depend only upon the geometrical relationship between the wheel axes and the vehicle axes.

An inverse transformation must be made by the command distribution matrix 36, i.e., from vehicle axes to wheel axes. However, a four-by-three matrix has no true inverse, and the command distribution matrix is not unique, since there is an infinite number of ways that the three vehicle-axis momentum commands may be distributed among four or more wheels. One well known technique for formulating the distribution matrix 36 is to use what is referred to as a pseudo-inverse of the resolution matrix C. The pseudo-inverse matrix $C^+$ is related to the torque or momentum components in the wheel axes and vehicle axes, as follows:

$$\begin{bmatrix} V_1 \\ V_2 \\ V_3 \\ V_4 \end{bmatrix} = C^+ \begin{bmatrix} V_x \\ V_y \\ V_z \end{bmatrix} \tag{2}$$

The pseudo inverse transformation technique is well known, and as discussed, for example, in "Some Applications of the Pseudoinverse of a Matrix" by T. N. E. Greville, SIAM Review, Vol. 2, No. 1, pp. 15–22, January, 1961.

It is also well known that the command distribution matrix may be modified upon failure of one of the wheels 40. In the system illustrated in FIG. 2, if any of the reaction wheels were to fail, the desired momentum or torque distribution could be obtained by utilizing only the three remaining wheels, provided that the axes of the remaining wheels were not coplanar. When one wheel is taken out of operation, the transformation matrix C and the pseudo inverse $C^+$ become three-by-three matrices, and the pseudoinverse $C^+$ is in fact identical to the true inverse of the matrix C. In any event, when one of the wheels fails, the command distribution matrix 36 must be modified from its original three-by-four form to a three-by-three form, so that the three vehicle-axis momentum commands will be distributed among only three reaction wheels, instead of among four. Although this concept of reconfiguration for a lesser number of reaction wheels is well known, there has heretofore been no effective technique for detecting the failure of reaction wheels, or for automatically reconfiguring the command distribution matrix to compensate for the failure, or for compensating the dynamic effect of the momenta of failed wheels.

Figure 3:
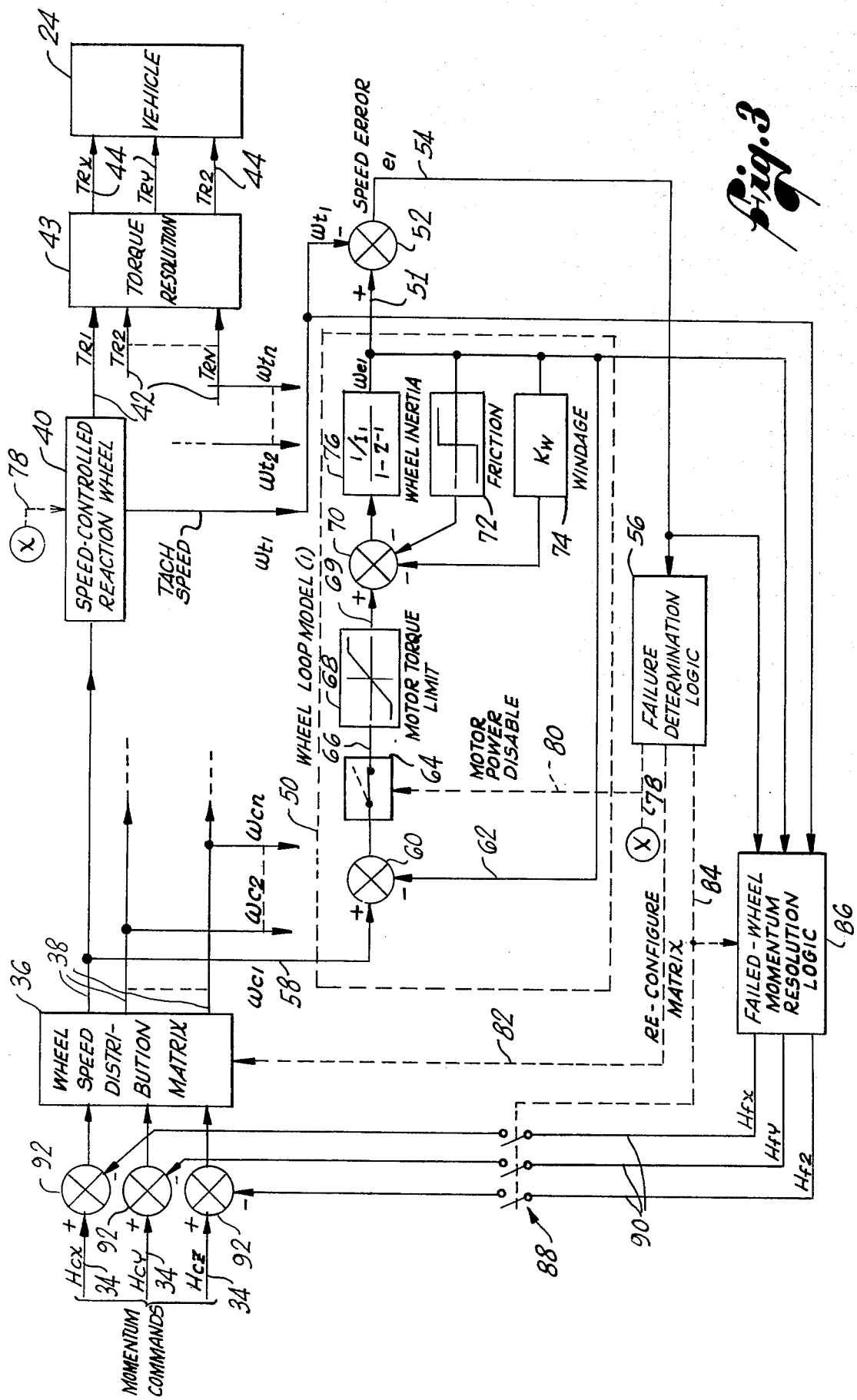
FIG. 3 is a block digram of a skewed-axis reaction wheel attitude control system similar to that shown in FIG. 2, but incorporating the failure detection and compensation apparatus of the invention.

In accordance with the invention, and as shown in block diagram form in FIG. 3, each speed-controlled reaction wheel 40 in the system is simulated in a wheel loop model 50, which generates on line 51 an estimated wheel speed $\omega_{ej}$, where j is the number or index of the wheel, and the estimated speed is derived from the commanded wheel speed $\omega_{cj}$ provided by the distribution matrix 36. The estimated wheel speed $\omega_{ej}$ is compared with a corresponding observed wheel speed $\omega_{tj}$ provided by a tachometer attached to the wheel. As indicated by the summer 52, the observed wheel speed $\omega_{tj}$ is subtracted from the estimated wheel speed $\omega_{ej}$ to derive a speed error $e_j$, which is transmitted over line 54 to failure determination logic 56. This logic operates in accordance with a failure criterion, to determine whether the speed error $e_j$ is of sufficient magnitude, or has persisted for a sufficient time, to be regarded as an indication of failure of the wheel.

Except for the wheel loop models 50, and other related components to be described, the control system of FIG. 3 is similar to that shown in FIG. 2, and identical reference numerals have been used to identify corresponding elements in the two figures. In FIG. 3, the distribution matrix 36 generates n speed signals on lines 38 to the speed-controlled reaction wheels 40. Torque or momentum components, as shown on lines 42 are resolved in the physical resolution matrix 43, and the resulting torques or momentum components in the x, y and z axes are applied to the vehicle 24, as shown by lines 44. The attitude sensors 26 and momentum command generation logic 28 of FIG. 2 have been omitted from FIG. 3 for simplicity.

As indicated in FIG. 3, each wheel loop model 50 receives a commanded wheel speed $\omega_{cj}$ over line 58 connected to one of the lines 38 from the distribution matrix 36. As indicated by a summer 60, the estimated wheel speed $\omega_{ej}$, which is fed over line 62 from the wheel loop model output on line 51, is subtracted from the commanded wheel speed, and the difference is transmitted through a logical switch 64 which, if the wheel is in normal operation, will be closed. The diference signal is then applied over line 66 to a drive motor simulator 68. As indicated in the block 68, the speed-torque characteristic of the drive motor for each reaction wheel 40 is such that the torque is considered to vary linearly with speed until a maximum torque is reached in both the positive and negative directions. The signal appearing on line 69 from the drive motor simulator 68 is proportional to the torque supplied to the wheel by its drive motor.

Subtracted from this drive torque signal in another summer 70, are torque signals representative of friction drag and windage drag in the motor. As indicated diagrammatically in the feedback transfer function block 72, friction torque is considered to be constant in magnitude, and dependent in direction upon the direction of rotation of the wheel. The windage torque is considered to be linearly proportional to wheel speed, as indicated by the constant $K_w$ in the transfer function block 74. The output of the summer 70 is applied to a wheel transfer function block 76, representative of the moment of inertia of the wheel. As is well known in control system theory, the effect of the wheel inertia is effectively to integrate the torque-related signal applied to it, and the output signal on line 51 is therefore proportional to the angular momentum or speed of rotation of the wheel. The transfer function shown in the wheel inertia block 76 is indicated in a z-transform format well known in sampled-data control system theory.

In the failure determination logic 56, the magnitude of the speed error $e_j$ is first compared with a preselected threshold value. If the threshold value is continuously exceeded by $e_j$, for a preselected grace period, failure is deemed to have occurred. The threshold and the grace period are selected to allow transient deviations of the wheel speed from the predicted or estimated speed, without triggering a failure condition. This also provides insensitivity of the detection process to modeling errors. Upon the detection of a failure in the failure determination logic 56, the appropriate reaction wheel is switched off, as indicated by the broken line 78 and the connectors X, and, to preserve the fidelity of the wheel loop model 50, the logical switch 65 is opened, as indicated by the broken line 80. The model 50 then simulates a free-running wheel, influenced only by friction and windage torques. The failure determination logic 56 also triggers reconfiguration of the distribution matrix 36, as indicated by the broken line 82. As indicated by the broken line 84, the failure determination logic 56 also initiates operation of failed-wheel momentum resolution logic 86, and simultaneously effects closure of three switches 88 located in three lines 90 from the failed wheel momentum resolution logic. The lines 90 are connected as negative inputs to three corresponding summers 92, which also receive, as positive inputs, the x, y and z axis momentum commands over lines 34. The outputs of the summers 92 provide the three momentum command signals to the distribution matrix 36.

The purpose of the failed-wheel momentum logic 86 is to compensate for the angular momentum of a failed wheel or wheels which have been switched out of the system, but which nevertheless contribute momentum to the three vehicle axes. Essentially, and as will be explained in further detail, the failed-wheel momentum resolution logic 86 resolves the momentum of each failed wheel in the three vehicle axes, utilizing appropriate elements of the transformation matrix C, and sums the vehicle axis contributions of all of the failed wheels for transmission over the lines 90 to the summers 92. The contributions of the failed wheels in the respective vehicle axes are subtracted from the momentum commands on lines 34, since, if they were not, distribution of the momentum commands to the remaining wheels would be made on the erroneous assumption that the failed wheels were contributing no momentum. It will be appreciated that, as the failed wheels gradually decelerate under the influence of friction and windage torques, the contributions of these wheels to the angular momenta in the three vehicle axes will progressivly diminish.

Contained within the failed-wheel momentum resolution logic 86 is logic for determining, for each failed wheel, whether the tachometer associated with that wheel is providing valid speed data. If the speed error signal $e_j$ at the instant of failure detection exceeds some specified threshold, it will be assumed that the tachometer data, i.e., $\omega_{tj}$, is not valid. In computing the resolved contributions of the failed wheel angular momentum along the three vehicle axes, the actual or observed wheel speed $\omega_{tj}$ will be used if the tachometer readings are still considered to be valid, or the estimated wheel speed $\omega_{ej}$ will be used if the tachometer readings are considered to be invalid.

In mathematical terms, what the failed-wheel momentum resolution logic does is to generate three failed-wheel momentum contributions, in the x, y and z axes, given by the following expressions:

$$H_{fx} = \sum_k C_{xk} \omega_{fk} \qquad (3)$$

$$H_{fy} = \sum_k C_{yk} \omega_{fk}$$

$$H_{fz} = \sum_k C_{zk} \omega_{fk}$$

where:
$H_{fx}$, $H_{fy}$ and $H_{fz}$ are the resolved failed-wheel momentum contributions;
k is the failed wheel index;
$C_{xk}$, $C_{yk}$ and $C_{zk}$ are elements of the previously defined transformation matrix C; and
$\omega_{fk}$ is the speed of wheel k; and where the value of $\omega_{fk}$ is determined for each wheel as follows:
$\omega_{fk} = \omega_{tk}$, if $e_k$ is less than a threshold value $e_v$ at time of failure, and
$\omega_{fk} = \omega_{ek}$, if $e_k$ is not less than $e_v$ at the time of failure.

It will be appreciated that the various control system elements shown in the block diagram of FIG. 3 can be implemented in a variety of hardware forms. For example, analog electronic circuitry could be used throughout, and the speed and angular momentum signals could then be continuously variable analog signals. Alternatively, digital circuitry could be employed, and, most conveniently, a single sequential data processing unit could be utilized to perform the required signal manipulations on a cycle basis. In the presently preferred embodiment of the invention, a special-purpose digital microprocessor is employed. It executes the required attitude control and failure detection functions, as well as a number of other control functions unrelated to the invention, in a sequential fashion. Accordingly, the mechanization employed is essentially one of a sampled-data control system, although it will be appreciated that equivalent results could be obtained in an analog mechanization of the invention.

Figure 4A:
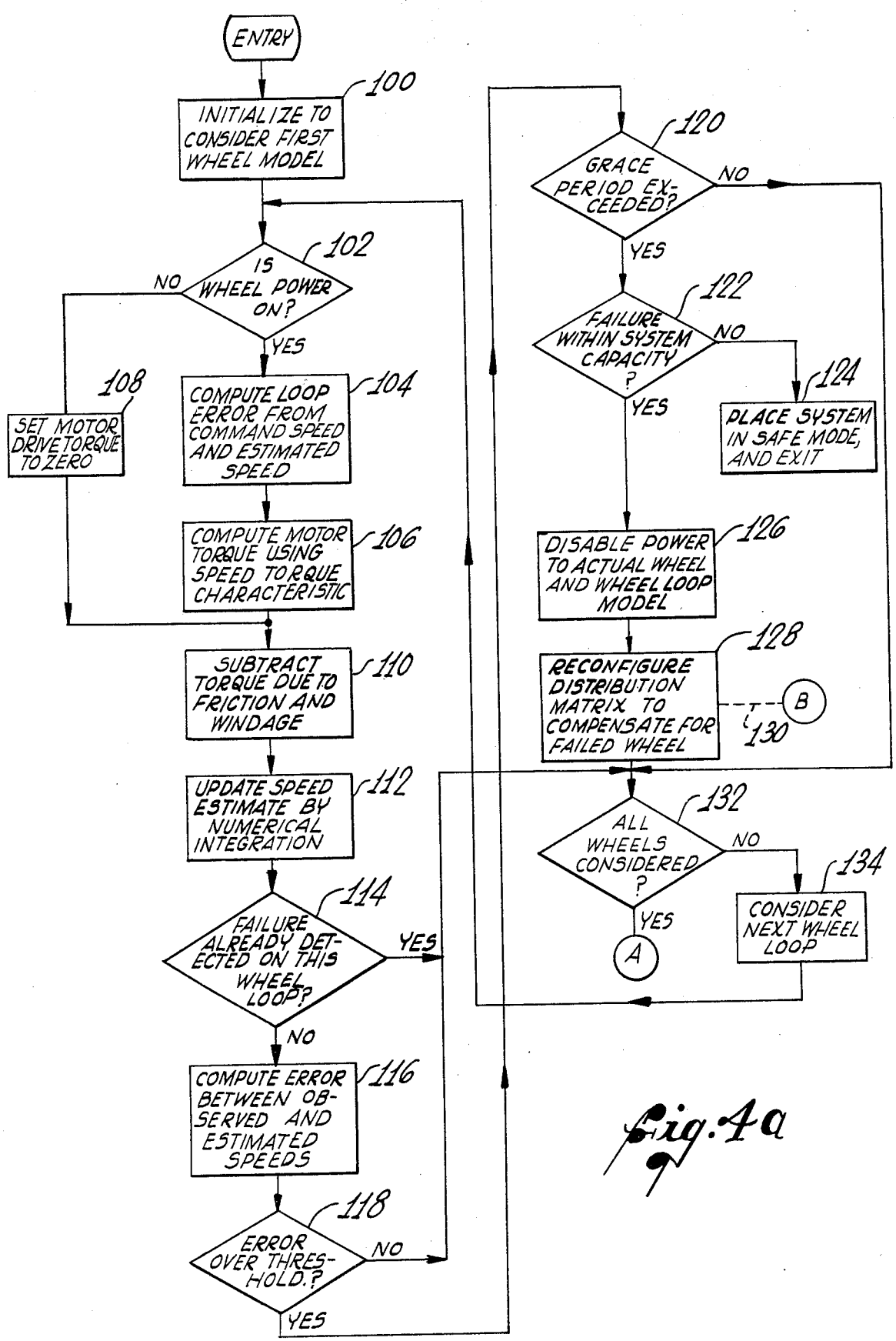
FIGS. 4a and 4b are functional flowcharts defining the operation of the failure detection and compensation apparatus of the invention.

The functions of the microprocessor that relate to failure detection and compensation are defined in the flowchart of FIG. 4. The flowchart has an "entry" point and an "exit" point, and it will be understood that this is intended to indicate only that the functions are performed in sequential relationship to other functions that are unrelated to the invention. The flowchart functions are performed cyclically, at a rate on the order of once very 100 milliseconds. The control system therefore functions as a sampled-data system with a sampling rate of approximately 10 Hz.

The first illustrated step in the operation of the invention apparatus relates to the wheel loop model 50 (FIG. 3). As shown in block 100, initialization is first performed to consider the first wheel loop model. As will shortly be appreciated, the apparatus performs a series of computations for the first wheel loop model, and then advances to perform the same computations for each of the wheel loop models in turn.

In the next block, indicated at 102, the question is asked whether the wheel power is on. If it is, indicating that the wheel under consideration has not yet failed, or has not been switched off for other reasons, the loop error is computed by subtracting the estimated speed from the command speed, as indicated in block 104. Then, in block 106, the motor torque is limited to a maximum value in accordance with the characteristic shown in block 68 of FIG. 3. If the wheel power is not on, indicating a failed-wheel condition, or that power has been disconnected from the wheel for some reason unrelated to this invention, the drive motor torque is set to zero, as indicated in block 108, to simulate an open condition of the logical switch 64 (FIG. 3), and the computations of blocks 104 and 106 are not performed.

Next, in block 110, torques proportional to the friction and windage contributions are computed and subtracted from the motor drive torque. This block is functionally equivalent to the transfer function blocks 72 and 74, and the summer 70 in FIG. 3. Then, the estimated speed is updated by numerical integration of the result of the previous step in block 110, as shown in block 112. This is equivalent to the wheel inertia transfer function block 76 in FIG. 3.

Next, the question is asked, in block 114, whether a failure has already been detected for this wheel. If the answer is no, the error between the observed and estimated speeds is computed, as shown in block 116. This is functionally equivalent to the operation of the summer 52 in FIG. 3. Then a check is made, in block 118, to determine whether the error exceeds a preselected threshold value. If it does, another check is made, in block 120, to determine whether the preselected grace period has been exceeded. If the answer to this question is also affirmative, this is equivalent to a decision by the failure determination logic that a wheel failure has occurred.

Following detection of such a failure, it is next asked, in block 122, whether the failure is within the system capacity. If the failure reduces the number of remaining reaction wheels to two, the system is placed in a safe mode and exit is made, as indicated at block 124, since it is beyond the capacity of the system to achieve the desired three axis control characteristics with only two control wheels. If the number of remaining wheels is three or more, power to the failed wheel is disabled, and the logical switch 64 (FIG. 3) in the corresponding wheel loop model is opened, as indicated at block 126.

Next, the distribution matrix 36 (FIG. 3) is reconfigured to compensate for loss of the failed wheel, as indicated at block 128. This reconfiguration operation is also shown diagrammatically by the broken line 130 in FIG. 4 extending through connector A to the distribution matrix 36. In practice, the reconfiguration operation involves selection of a new matrix to replace the one that was previously used. In a four-wheel system, therefore, a total of five matrices must be stored, one for the intact four-wheel system, and one for each of the four three-wheel configurations that can result from the failure of one of the four wheels. A correspondingly larger number of matrices must, of course, be stored for systems having more than one redundant reaction wheel.

After reconfiguration of the distribution matrix in block 128, the question is asked in block 132 whether all wheel loops have been considered. If not, the next wheel loop is considered, as indicated at block 134, and transfer is made back to block 102 to repeat the entire process for the next and remaining wheel loops in the system.

For any wheels for which failure has been already detected, as determined in block 114, transfer is made directly to block 132, and no further inquiry into the failure of the wheel is made. Also, if the speed error does not exceed the preselected threshold value, or if the grace period is not exceeded, as determined in blocks 118 and 120, respectively, transfer is also made directly to block 132, to advance to consideration of the next wheel loop.

Figure 4B:
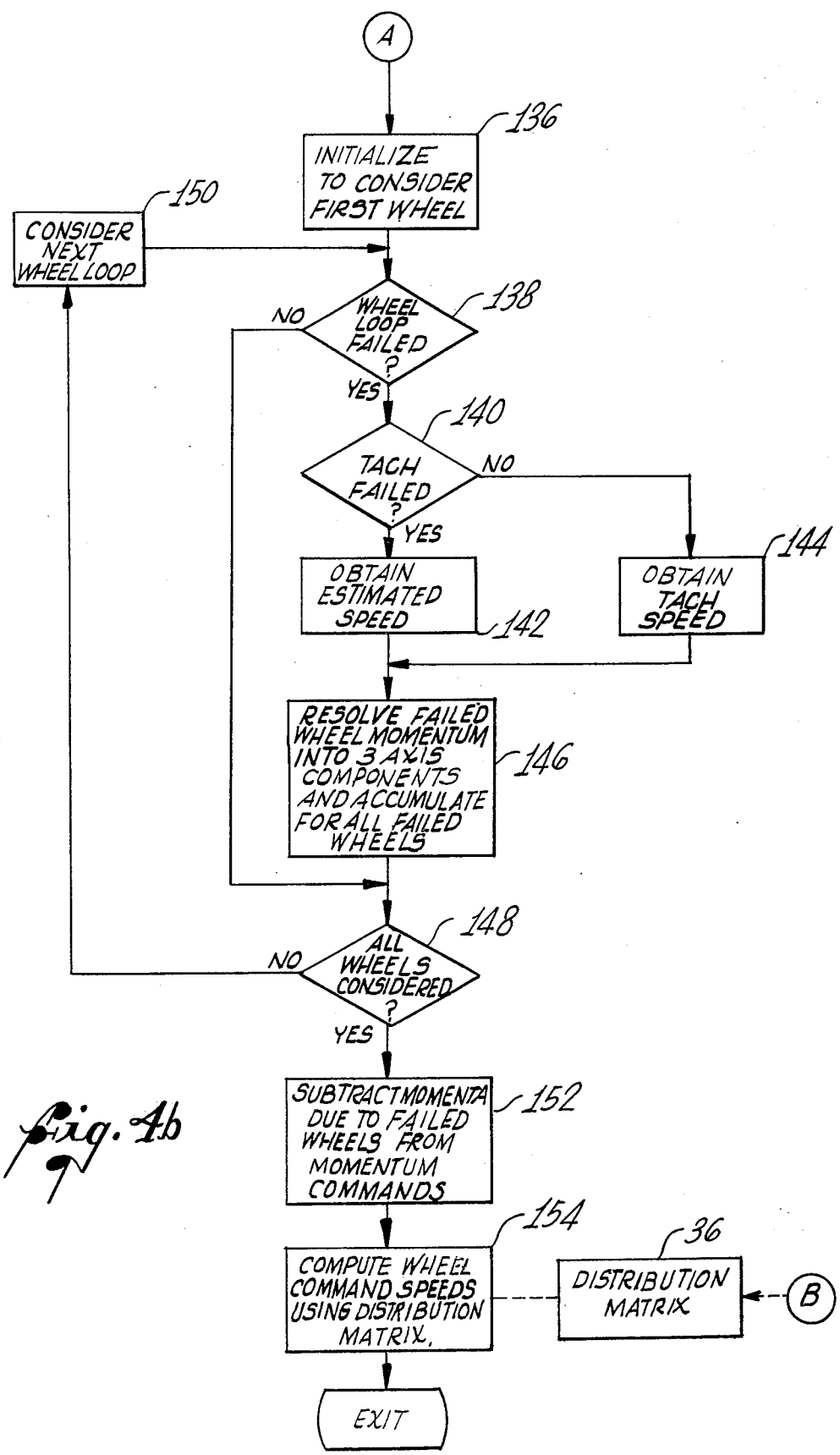

After all of the wheel loops have been considered in this manner, transfer is made, via connector B, to block 136 in FIG. 4b, where initialization is again performed to consider the first wheel loop. Inquiry is then made to determine whether the wheel under consideration has failed, as indicated at block 138. If it is a failed wheel, a determination is next made as to whether the tachometer associated with the wheel has also failed, as indicated at block 140. The answer to this question is determined by comparing the speed error $e_j$ with the preselected threshold value $e_\nu$. If the speed error $e_j$ exceeds the threshold value $e_\nu$, the tachometer speed is considered to be erroneous, and the estimated speed $\omega_{ej}$ is used in subsequent calculations, as indicated in block 142. If the speed error $e_j$ does not exceed the threshold value $e_\nu$, the tachometer speed is assumed to be valid, and the tachometer speed $\omega_{tj}$ is used in subsequent calculations, as indicated at block 144. Next, the failed wheel momentum is resolved into the three x, y and z vehicle-axis components, by multiplying the momentum of the failed wheel, using either the estimated speed or the tachometer speed, by the appropriate elements in the transformation matric C. More specifically, the momentum contributions of failed wheels of index k are obtained from equations (3).

Following this computation for each wheel, the question is asked, in block 148, whether all wheels have been considered. If they have not, the next wheel is considered, as indicated in block 150, and control is transferred back to block 138 to consider the other wheels in turn in this manner.

For wheels that have not failed, as determined in block 138, transfer is made directly to block 148 and the entire computation with respect to resolution of failed-wheel momentum is bypassed. Subsequently, as indicated in block 152, the resolved components of the failed-wheel momenta are subtracted from the correponding momentum commands on lines 34 (FIG. 3), this operation being directly equivalent to that of the summers 92 (FIG. 3). Finally, in block 154, the wheel command speeds are computed using either the original or reconfigured distribution matrix 36.

Again, it will be appreciated that the functions described in FIG. 4 are performed cyclicly and very rapidly, at approximately a 100-millisecond cycle rate. In this manner, continuous control of the attitude of the vehicle is closely approached. As in any control system, there are a number of variables that can affect the bandwidth or response characteristics of the failure detection and compensation system. Ideally, the system should be able to respond to wheel failures as rapidly as it can respond to other disturbances, such as external torques acting on the vehicle. The present invention approaches this capability, while the alternative of failure detection and compensation by observation of the vehicle attitude performance does not provide nearly the same rapid response, and may result in complete loss of attitude control for a time.

It will be appreciated from the foregoing that the present invention represents a significant advance in the field of control systems having redundant control elements, the failure of which must be detected and compensated as rapidly as possible to provide continuity of operation. In particular, the invention provides for the detection of failure of reaction wheels in a satellite attitude control system, and for the rapid compensation for a detected reaction wheel failure, as well as compensation for the presence of stored momentum in failed but still rotating reaction wheels. It will also be appreciated that, although a particular embodiment of the invention has been described in detail for purposes of illustration, various modifications may be made without departing from the spirit and scope of the invention. For example, the invention also may be applied to orthogonal redundant systems. Accordingly, the invention is not to be limited except as by the appended claims.

I claim:

1. For use in a control system having a plurality of control elements of the type that may contribute control forces even after failure, at least one of the control elements being redundant, apparatus for detecting control element failure, said apparatus comprising:

control element modeling means, for simulating operation of the control elements and generating an estimated value of a performance parameter for each control element;

measuring means for obtaining an observed value of the performance parameter for each control element;

failure determination means for comparing said estimated performance parameter with said observed performance parameter and determining whether a control element failure has occurred; and control means responsive to detection of a failure by said failure determination means, for deactivating the failed control element and for modifying said control element modeling means to take the failure into account.

2. Apparatus as set forth in claim 1, and further including means for compensating for a failure to ensure continuing performance of the apparatus after deactivation of a failed control element.

3. Apparatus as set forth in claim 2, wherein said means for compensating for a failure includes means for compensating for the continuing effect of a failed control element after its deactivation.

4. For use in a vehicle attitude control system having a plurality of control elements of the type that may contribute control forces even after failure, at least one of the control elements being redundant, control element failure detection and compensation apparatus, comprising:

distribution matrix means for distributing to the plurality of control elements a like plurality of control signals derived from a set of attitude commands relating to a corresponding set of axes of the vehicle;

control element modeling means coupled to said distribution matrix means, for simulating operation of the control elements and generating an estimated value of a performance parameter for each control element;

measuring means for obtaining an observed value of the performance parameter for each control element;

failure determination means for comparing said estimated performance parameter with said observed performance parameter and determining whether a control element failure has occurred;

means responsive to detection of a failure by said failure determination means, for deactivating the failed control element and for modifying said control element modeling means to take the failure into account; and means for automatically compensating for a failure to ensure continuing performance of the apparatus after deactivation of a failed control element.

5. Control element failure detection and compensation apparatus as set forth in claim 4, wherein said means for automatically compensating for a failure includes means for modifying said distribution matrix means to properly distribute control signals to only the remaining control elements.

6. Control element failure detection and compensation apparatus as set forth in claim 5, wherein said means for automatically compensating for a failure includes means for compensating for the continuing effect of a failed control element after its deactivation.

7. Control element failure detection and compensation apparatus as set forth in claim 4, wherein:
said control elements are reaction wheels driven by speed-controlled motors;
the performance parameter for each of said reaction wheels is its speed of rotation; and
said distribution matrix means distributes speed control signals to said speed-controlled motors.

8. Control element failure detection and compensation apparatus as set forth in claim 7, wherein said means for automatically compensating for a failure includes:
means for reconfiguring said distribution matrix means to exclude the failed wheel and distribute speed control signals to the remaining wheels; and
means for compensating for the continuing effect of the failed wheel and its momentum contribution to the attitude of the vehicle.

9. Control element failure detection and compensation apparatus as set forth in claim 7, wherein said failure determination means includes:
subtraction means for computing the difference between the estimated and observed values of wheel speed; and
means for determining whether the difference has exceeded a preselected threshold for a preselected time.

10. For use in a satellite attitude control system having a plurality of speed-controlled, skewed-axis reaction wheels, means for sensing attitude, means for deriving angular momentum commands for three vehicle axes from the sensed attitude and from attitude commands, and distribution matrix means for distributing the angular momentum commands among the reaction wheels, failure detection and compensation apparatus comprising:
wheel loop modeling means for each speed-controlled reaction wheel, for receiving speed command signals from the distribution matrix means, and for generating therefrom an estimated speed signal for each wheel;
means for obtaining a speed error signal from the difference between said estimated speed signal and a signal representative of the observed speed of the corresponding reaction wheel;
failure determination means, for determining whether a failure has occurred by monitoring said error signal;
means responsive to the detection of a reaction wheel failure, for deactivating the failed wheel and for modifying said wheel loop modeling means to simulate deactivation of the failed wheel; and
means also responsive to the detection of a reaction wheel failure, for reconfiguring the distribution matrix means to exclude the failed wheel.

11. Failure detection and compensation apparatus as set forth in claim 10, wherein said means for determining whether a failure has occurred includes means for determining whether said error signal has exceeded a preselected threshold value for a preselected time.

12. Failure detection and compensation apparatus as set forth in claim 10, and further including:
means for resolving the momentum contributions of failed wheels along the three vehicle axes; and
means for subtracting these momentum contributions from corresponding momentum commands in the three vehicle axes, before application to the distribution matrix means.

13. Failure detection and compensation apparatus as set forth in claim 12, wherein said wheel loop modeling means includes, for each wheel loop:
means for obtaining a speed loop error signal by subtracting said estimated speed from said speed command signal; and
means for integrating said speed loop error signal and dividing by the moment of inertia of the wheel to obtain the estimated speed signal.

14. Failure detection and compensation apparatus as set forth in claim 13, wherein said wheel loop modeling means further includes:
drive motor simulation means, to make allowance for a torque-limited drive motor; and
friction and windage simulation means, to derive drag torques due to friction and windage as functions of speed, and to subtract these drag torques from the torque-limited motor drive torque, before application to said means for integrating said speed loop error signal.

15. A skewed-axis reaction wheel satellite attitude control system, comprising:
means for sensing attitude with respect to three orthogonal vehicle axes;
at least four speed-controlled reaction wheels having axes skewed to the vehicle axes;
means for generating a set of three vehicle-axis angular momentum commands from the sensed attitude and attitude commands;
a wheel-speed distribution matrix for transforming said set of three momentum commands into a set of at least four wheel speed commands to effect the three momentum commands;
at least four wheel loop models for simulating operation of said speed-controlled reaction wheels, and generating estimated wheel speeds from said wheel speed commands;
speed measuring means for obtaining the actual speeds of said reaction wheels;
subtraction means for determining the speed differences between corresponding actual and estimated wheel peeds;
failure criterion means for generating a failed-wheel condition if any of said speed differences has exceeded a preselected threshold for a preselected time;
first means responsive to a failed-wheel condition, for deactivating the appropriate one of said reaction wheels, modifying the appropriate one of said wheel loop models to reflect such deactivation, and reconfiguring said distribution matrix to exclude the failed wheel and thereby distribute wheel speed commands to the remaining wheels; and second means responsive to a failed-wheel condition, for resolving the momentum contributions of all failed wheels in the three vehicle axes, and for subtracting the resolved momentum contributions from corresponding vehicle-axis momentum commands, before distribution by said distribution matrix.

16. A skewed-axis satelllite attitude control system as set forth in claim 15, wherein each of said wheel loop models includes:

means for obtaining a speed loop error signal by subtracting the estimated speed from the commanded speed; and means for integrating said speed loop error signal and dividing by the moment of inertia of the wheel to obtain the estimated speed.

17. A skewed-axis satellite attitude control system as set forth in claim 16, wherein each of said wheel loop models further includes:

drive motor simulation means, to make allowance for a torque-limited drive motor; and friction and windage simulation means, to derive drag torques due to friction and windage as functions of speed, and to subtract these drag torques from the torque-limited motor drive torque, before application to said means for integrating said speed loop error signal.

18. For use in a control system having a plurality of control elements of the type that may contribute control forces even after failure, at least one of the control elements being redundant, a method of detecting control element failure, said method comprising the steps of:

simulating operation of the control elements and thereby generating an estimated value of a performance parameter for each control element;

measuring the performance parameter for each control element to obtain an observed value thereof;

comparing the estimated performance parameter with the observed performance parameter;

determining whether a control element failure has occurred;

deactivating the failed control element upon detection of a failure; and modifying performance of said simulating step to take the failure into account.

19. A method as set forth in claim 18, and further including the step of compensating for a detected failure, to ensure continuing performance of the control system after deactivation of a failed control element.

20. A method as set forth in claim 19, wherein said compensating step includes compensating for the continuing effect of a failed control element after its deactivation.

21. For use in a vehicle attitude control system having a plurality of control elements of the type that may contribute control forces even after failure, at least one of the control elements being redundant, a method of control element failure detection and compensation, said method comprising the steps of:

distributing to the plurality of control elements a like plurality of control signals derived from a set of attitude commands relating to a corresponding set of axes of the vehicle;

simulating operation of the control elements and thereby generating an estimated value of a performance parameter for each control element;

measuring the performance parameter for each control element to obtain an observed value thereof;

comparing the estimated performance parameter with the observed performance parameter;

determining whether a control element failure has occurred;

deactivating the failed control element upon detection of a failure;

modifying performance of said simulating step upon detection of a failure, to take the failure into account; and compensating for a failure to ensure continuing performance of the control system after deactivation of a failed control element.

22. A method of control element failure detection and compensation as set forth in claim 21, wherein said step of compensating for a failure includes modifying said distributing step to properly distribute control signals to only the remaining control elements.

23. A method of control element failure detection and compensation as set forth in claim 22, wherein said step of compensating for a failure further includes compensating for the continuing effect of a failed control element after its deactivation.

24. A method of control element failure detection and compensation as set forth in claim 23, wherein:

the control elements are reaction wheels driven by speed-controlled motors;

the performance parameter for each of said reaction wheels is its speed of rotation; and said distributing step distributes speed control signals to the speed-controlled motors.

25. A method of control element failure detection and compensation as set forth in claim 24, wherein said step of compensating for a failure includes:

reconfiguring a distribution matrix to exclude the failed wheel and thereby distribute speed control signals to the remaining wheels; and compensating for the continuing effect of the failed wheel and its momentum contribution to the attitude of the vehicle.

26. A method of control element failure detection and compensation as set forth in claim 24, wherein said step of detecting whether a failure has occurred includes:

computing the magnitude of the difference between the estimated and observed values of wheel speed; and determining whether the difference has exceeded a preselected threshold for a preselected time.

27. For use in a satellite attitude control system having a plurality of speed-controlled, skewed-axis reaction wheels, means for sensing attitude, means for deriving angular momentum commands for three vehicle axes from the sensed attitude and from attitude commands, and distribution matrix means for distributing the angular momentum commands among the reaction wheels, a method of wheel failure detection and compensation, comprising the steps of:

receiving speed command signals from the distribution matrix means;

simulating operation of each speed-controlled reaction wheel, and generating therefrom an estimated speed signal for each wheel;

measuring the actual speed of each reaction wheel;

obtaining a speed error signal from the difference between the estimated speed signal and a signal representative of the actual speed of the corresponding reaction wheel;

determining whether a failure has occurred by monitoring the speed error signal;

deactivating the failed wheel upon detection of a failure;

modifying said simulating step to simulate deactivation of the failed wheel; and reconfiguring the distribution matrix means to exclude the failed wheel upon detection of a failure.

28. A methid of failure detection and compensation as set forth in claim 27, wherein said determining step includes determining whether the speed error signal has exceeded a preselected threshold value for a preselected time.

29. A method of failure detection and compensation as set forth in claim 27, and further including:

resolving the momentum contributions of failed wheels along the three vehicle axes; and subtracting these momentum contributions from corresponding momentum commands in the three vehicle axes, before application to the distribution matrix means.

30. A method of failure detection and compensation as set forth in claim 29, wherein said simulating step includes, for each wheel loop simulation, the steps of:

obtaining a speed loop error signal by subtracting the estimated speed signal from the speed command signal; and integrating the speed loop error signal and dividing by the moment of inertia of the wheel to obtain the estimated speed signal.

31. A method of failure detection and compensation as set forth in claim 30, wherein said simulating step further includes, for each wheel loop simulation, the steps of:

compensating for a torque-limited wheel drive motor;

deriving drag torques due to friction and windage as functions of speed; and subtracting these drag torques from the torque-limited motor drive torque, before performance of said integrating step.

* * * * *